US007194358B2

(12) United States Patent
Callaghan et al.

(10) Patent No.: US 7,194,358 B2
(45) Date of Patent: Mar. 20, 2007

(54) LIFT COLLISION AVOIDANCE SYSTEM

(75) Inventors: Michael L. Callaghan, Everett, WA (US); Jerry A. James, Seattle, WA (US); Shankar N. Swamy, Folsom, CA (US); James J. Troy, Issaquah, WA (US); Steven C. Venema, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 53 days.

(21) Appl. No.: 10/786,283

(22) Filed: Feb. 25, 2004

(65) Prior Publication Data

US 2005/0187712 A1 Aug. 25, 2005

(51) Int. Cl.
*G06F 17/10* (2006.01)

(52) U.S. Cl. ...................... 701/301; 701/300; 340/435; 340/436; 182/112; 187/223; 212/280

(58) Field of Classification Search ................ 701/300, 701/301; 340/435, 436, 555, 556, 557, 686.6; 182/112, 18; 187/223; 212/280
See application file for complete search history.

(56) References Cited

U.S. PATENT DOCUMENTS 3,670,849 A * 6/1972 Milner, Jr. ................... 182/19
3,814,211 A 6/1974 Pamer
4,931,930 A 6/1990 Shyu et al.
4,979,588 A * 12/1990 Pike et al. .................... 182/18
5,004,997 A 4/1991 Shisgal et al.
5,359,542 A * 10/1994 Pahmeier et al. ........... 701/301
5,363,940 A * 11/1994 Fahrion ..................... 182/62.5
5,548,515 A 8/1996 Pilley et al.
5,607,282 A * 3/1997 Brannen et al. ......... 414/796.3
5,740,047 A 4/1998 Pilley et al.
5,889,479 A 3/1999 Tabel
5,906,648 A * 5/1999 Zoratti et al. ................. 701/50
5,940,012 A 8/1999 Studebaker
6,294,985 B1 9/2001 Simon
6,462,697 B1 10/2002 Klamer et al.
2002/0074186 A1* 6/2002 Baldas et al. .............. 182/69.6
2003/0020610 A1* 1/2003 Swanson et al. ............ 340/566
2003/0122666 A1 7/2003 John et al.
2003/0189487 A1* 10/2003 Mathews et al. ........... 340/556
2004/0094077 A1* 5/2004 Stone ......................... 108/147

FOREIGN PATENT DOCUMENTS

EP 0 690 315 B1 5/2001

* cited by examiner

*Primary Examiner*—Thomas Black
*Assistant Examiner*—Brian J. Broadhead
(74) *Attorney, Agent, or Firm*—Lee & Hayes, PLLC

(57) ABSTRACT

The present invention is directed to systems, devices and methods for avoiding collisions and detecting objects proximate to a surface. In one embodiment, a system for collision avoidance includes at least one sensor adapted to sense an object above a lift device and a controller linked to the at least one sensor and linked to the drive components of the device and adapted to interrupt operation of the lift drive when the lift device approaches or touches the object. In another aspect of the invention, at least one controller is linked between at least one hand control and at least one drive adapted to move a lift device, the controller being adapted to interrupt operation of the drive when the lift device approaches or touches an object.

42 Claims, 13 Drawing Sheets

LIFT COLLISION AVOIDANCE SYSTEM

FIELD OF THE INVENTION

This invention relates generally to sensor systems and, more specifically, to anti-collision systems.

BACKGROUND OF THE INVENTION

Scissor-lifts and other worker lift devices are commonly used to lift workers and equipment during construction, painting, maintenance, assembly and manufacturing operations, including aircraft assembly. Scissor-lift devices typically include one or more sets of inter-tied scissors or a scissor stack operated by a hydraulic cylinder on a motor-driven base, and a basket from which a worker can work. Other lift devices such as boom lifts, cherry pickers and elevated work platforms have articulating or telescopic hydraulic, pneumatic, electrical or mechanical mechanisms carrying the worker basket and may be mounted on wheel-driven or track-mounted bases. When a lift device is being operated near fixtures or equipment, operator error or miscalculation can result in damage to the equipment or fixtures being worked on. Commonly a worker may be looking in one direction, and does not see how the lift device will contact surrounding equipment or fixtures as the lift is being moved because the portion of the lift outside of the view of the worker is the part that contacts the equipment or fixtures, sometimes resulting in damage. Alternately, the worker may not know, or may miscalculate, the orientation of the steering mechanism of the lift device. In such a case, when the worker moves a hand control to move the lift device laterally across the supporting surface, the device may move in an unexpected direction, contacting the equipment or fixtures being worked on. Lift devices that have overhangs can also be moved down into contact with fixtures or equipment.

Current lift devices typically rely on operator awareness and experience to avoid damaging contact with surrounding equipment and fixtures. Thus, there is an unmet need for a collision avoidance system and sensor modules easily adapted to lift devices and other components where collision or contact with surrounding objects is to be avoided.

SUMMARY OF THE INVENTION

The present invention is directed to systems, devices and methods for avoiding collisions and detecting objects proximate to a surface. In one embodiment, a system for collision avoidance includes at least one sensor adapted to sense an object above a lift device and a controller linked to the at least one sensor and linked to the drive components of the device and adapted to interrupt operation of the lift drive when the lift device approaches or touches the object. In another aspect of the invention, at least one controller is linked between at least one hand control and at least one drive adapted to move a lift device, the controller being adapted to interrupt operation of the drive when the lift device approaches or touches an object.

In accordance with other aspects of the invention, a sensor module or a sensor module network includes a module adapted to hold a plurality of sensors, including at least one proximity sensor and at least one through-beam sensor.

BRIEF DESCRIPTION OF THE DRAWINGS

The preferred and alternative embodiments of the present invention are described in detail below with reference to the following drawings.

DETAILED DESCRIPTION OF THE INVENTION

The present invention relates to systems, devices and methods for collision avoidance and proximity sensing. Many specific details of certain embodiments of the invention are set forth in the following description and in FIGS. 1 through 13 to provide a thorough understanding of such embodiments. One skilled in the art, however, will understand that the present invention may have additional embodiments, or that the present invention may be practiced without several of the details described in the following description.

Figure 1:
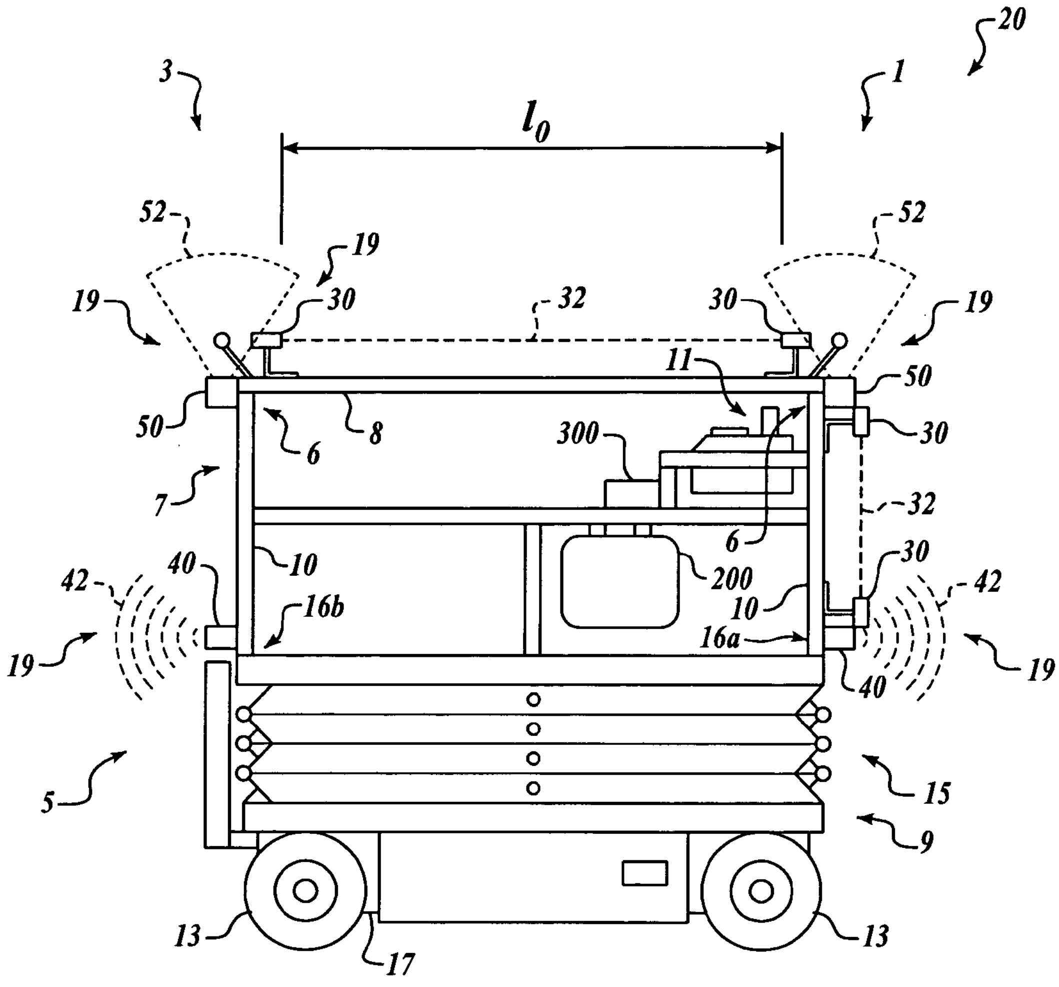
FIG. 1 is a side-view of an exemplary scissor lift incorporating a collision avoidance system in accordance with an embodiment of the present invention.

FIG. 1 shows an exemplary collision avoidance system in accordance with an embodiment of the present invention incorporated on a scissor-lift lift device 5, shown here in a lowered configuration in side view. The lift device includes a base 9, raising and lowering scissor stack 15, and a basket 7 for holding one or more workers. The base 9 includes a motor compartment 17 incorporating a conventional drive system and a conventional steering system (not shown). Wheels 13 move the lift device 5 laterally across a surface. Two or more of wheels 13 are steerable. The lift device is controlled by a hand control unit 11 located in the basket 7. The hand control unit 11 permits the lift device 5 to be raised and lowered and moved laterally according to the needs of the worker. The basket 7 includes a top rail 8 and vertical rails 10. The hand control unit 11 is mounted in the basket 7 towards the front end 1 of the lift device 5.

In this exemplary embodiment, a collision avoidance system 20 includes a plurality of sensors 19 attached to the basket 7 and arranged to detect the proximity of surrounding objects so that the system 20 can, through a logic controller 200, stop movement of the lift device 5 to prevent a collision with a nearby object. The plurality of sensors 19 may be adapted to provide multi-directional and area-wide sensing coverage. As shown in FIG. 1, attached to a top rail 8 and a vertical rail 10 are a plurality of through-beam light sensors 30 that transmit an infrared beam 32 between the through-beam sensors 30, detecting an object if it comes between the through-beam sensors 30. The through-beam sensors 30 can thus sense the proximity of an object (not shown) before a collision with the top rail 8 and the vertical rail 10 in the area between the through-beam sensors 30.

In this exemplary embodiment, the through-beam sensors are attached to the top rail 8 near the front end 1 and the rear end 3 of the basket 7, thereby providing object proximity sensing along a substantial majority of the length $l_0$ between the front end 1 and the rear end 30 of the basket 7. The through-beam sensors 30 typically do not protect the through-beam sensors 30 themselves from being struck by an object, because the through-beam sensors 30 generally detect objects between the sensors, not those approaching the through-beam sensors from a different direction. Additional optical proximity detectors 50, in this exemplary embodiment, are thus installed at the front end 1 and the rear end 3 of the basket 7 with their proximity detection region 52 directed upward to protect against collision with any object approaching the through-beam sensors 30 from above. In this example, the proximity detection regions 52 are approximately cone shaped.

In this exemplary embodiment, the collision avoidance system 20 also includes through beam sensors 30 mounted on the front end 1 vertical rails 10 on the basket 7. In this embodiment the through beam sensors 30 are mounted at the upper and lower ends of the vertical rails 10. The through beam sensor 30 at the bottom of the vertical rail 10 near a lower corner 16*a* of the basket 7, as well as the basket itself, are protected from approaching objects that would not otherwise interrupt the infrared beam 32 between the two through beam sensors 30 by an ultrasonic proximity detector 40 located near the lower front corner 16*a* of the basket 7. The ultrasonic proximity detector 40 has its ultrasonic detection region 42 directed away from the front end 1 of the basket 7, thus arranged to detect an object (not shown) approaching the basket 7 from the front. Similarly, an additional ultrasonic proximity detector 40 is positioned near a lower rear corner 16*b* of the basket 7 with its ultrasonic detection reading 42 directed away from the rear end 3. This ultrasonic proximity detector 40 detects objects to the rear of the lift device 5.

It will be appreciated that the collision avoidance system 20 can detect the basket 7 approaching an object at the front end 1 and at the rear end 3 through the ultrasonic detectors 40, and can also detect objects approaching the horizontal 8 and vertical rails 10 through the through-beam sensors 30. The collision avoidance system 20 can thereby detect objects approaching the basket 7 from a wide variety of directions. It will also be appreciated that on certain scissor-lifts or other lifts, the basket 7 may be translated or extended horizontally beyond the base 9 by an extension actuator (not shown), in which instance the system 20 would detect objects approaching the basket 7 when the basket 7 is extended (not shown).

As further shown in FIG. 1, the through-beam sensors 30, the ultrasonic proximity detectors 40, and the optical proximity detectors 50 are linked to a logic controller 200. The logic controller 200 is discussed more fully with reference to FIGS. 6–10 below. The collision avoidance system 20 also includes a display unit 300 linked to the logic controller 200 and the lift device 5, as described more fully with reference to FIGS. 8 and 11 below.

Figure 2A:
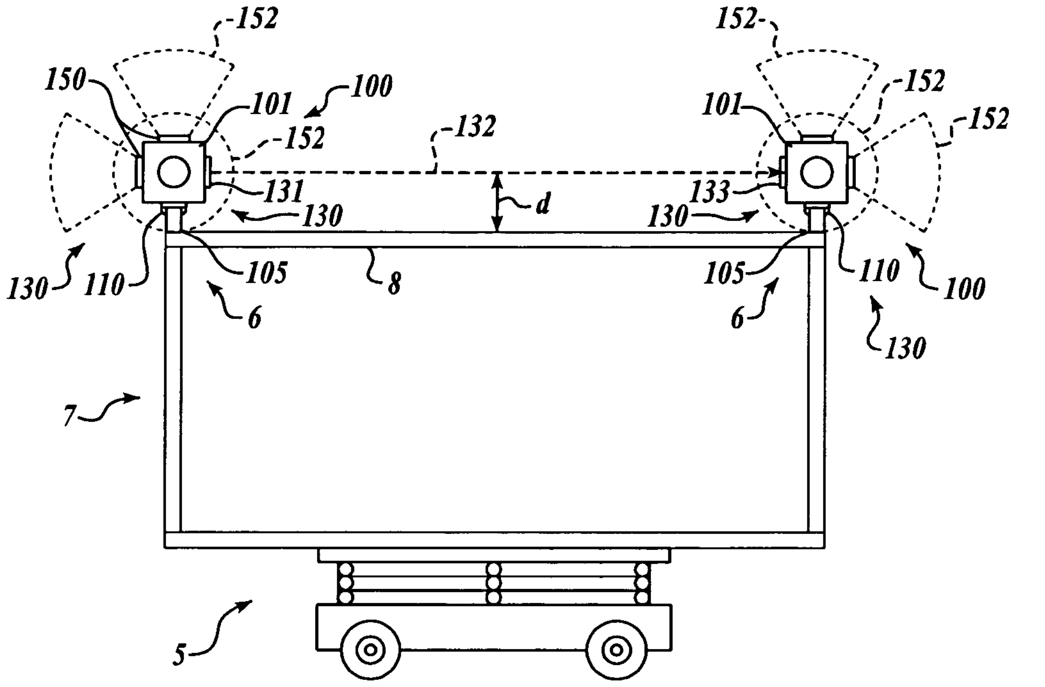
FIG. 2A is a side-view of exemplary sensor modules installed on a scissor lift in accordance with an embodiment of the present invention.
Figure 2B:
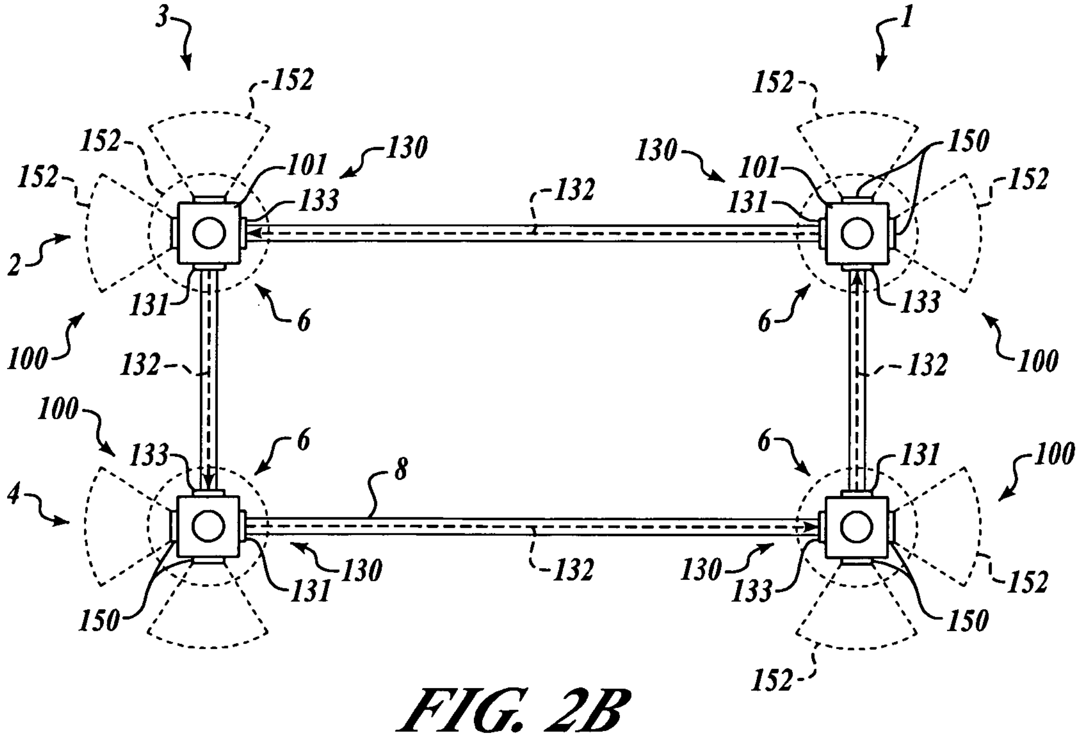
FIG. 2B is a top-view of the embodiment of the sensor modules installed on a scissor lift of FIG. 2A.

FIGS. 2A and 2B show an alternate configuration of through-beam sensors 130 and optical proximity detectors 150 mounted to the top rail 8 of the lift device 5. It will be appreciated that the configuration of sensors in FIGS. 2A and 2B may be combined with one or more other sensors or other sensor configurations to provide further sensor coverage.

In the exemplary embodiment shown in FIGS. 2A and 2B, the through-beam sensors 130 and the optical proximity detectors 150 are mounted in sensor modules 100 attached to the top rail 8 proximate to the upper corners 6 of the basket 7. The top rail 8 surrounding the basket 7 forms a rectangle. Thus, it will be appreciated that four sensor modules 100 as shown in FIG. 2B, a top view of the top rail 8, are located at the corners of that rectangle.

More specifically, as shown in FIG. 2A, each sensor module 100, by way of example, but not limitation, is a corner module 101. In this embodiment, each corner module 101 is roughly cubical, and includes three optical proximity detectors 150 "looking" outward, orthogonal to each other, plus a through-beam receptor 133, and a through-beam source 131, also orthogonal to each other and to the optical proximity detectors 150. Each of the corner modules 101 is attached to an upper corner 6 of the basket 7 with a mount 105. Linked to the mount 105 and the corner module 101 is a contact switch 110. It will be appreciated that certain non-reflective objects or absorbing objects may not be sensed by the optical proximity detectors 150. If in an alternate embodiment the optical proximity detectors 150 are substituted with ultrasonic proximity detectors 40 (not shown), sound absorbing objects may not be sensed. Thus, the proximity detectors 40 may "miss" or not sense an object being approached by the basket 7. A contact switch 110 mounted between the mount 105 and the corner sensor module 101 senses anything touching the corner module 101 itself suitably providing a contact detection back-up to the optical proximity sensors 150 which can "miss" objects as noted.

Each corner module 101 has a through-beam source that emits an infrared beam 132. The beam 132 is detected by the through-beam receptor 133 by a counterpart corner module 101 at an adjoining corner 6. It will be appreciated that the corner modules project up from the upper corners 6 of the basket 7. Thus, the adjoining through-beam sources 131 and through-beam receptors 133 will detect objects being approached by the basket 7 between the upper corners 6 of the basket 7. The infrared beams 132 are projected between the corner modules 101 parallel to the top rail 8, albeit at a set-off distance d above the top rail 8. It will be appreciated that the mounts 105 for the corner modules 101 can hold the corner modules 101 outboard diagonally from the top rail 8, and not just above the top rail 8, providing an additional safety buffer around the top rail 8.

In the configuration shown in FIGS. 2A and 2B, it will be appreciated that by positioning four corner modules 110 on the four upper corners 6 of the basket 7, with each corner module 101 positioned in an orientation rotated 90° horizontally from its two adjoining neighbors, that optical proximity detection regions 152 suitably are directed upward at each corner 6, and outward from the right side 2 and the left side 4 of the basket 7, and away from the front end 1 and the rear end 3 of the basket 7, thus sensing the basket 7 approaching objects above, in front of, behind, and to the right and to the left of the basket corners 6. In addition to the proximity detectors 150, each corner module 101 emits an infrared beam 132 for sensing by one of its neighbor corner modules 101, and has a through-beam receptor 133 to receive an infrared beam 132 from its other neighboring corner module 101. Thus, infrared beams 132 are projected from corner 6 to corner 6 around the top of the basket 7. The through-beam receptors 133 send signals to the central logic controller (not shown) if an object breaks or interrupts the infrared beams 132. The four corner modules 101 thus provide proximity detection along the entire top rail 8 of the basket 7 as well as optical proximity detection above, and laterally out from the corners 6 at the front end 1, the rear end 3, the left side 2 and the right side 4 of the basket 7.

Figure 3A:
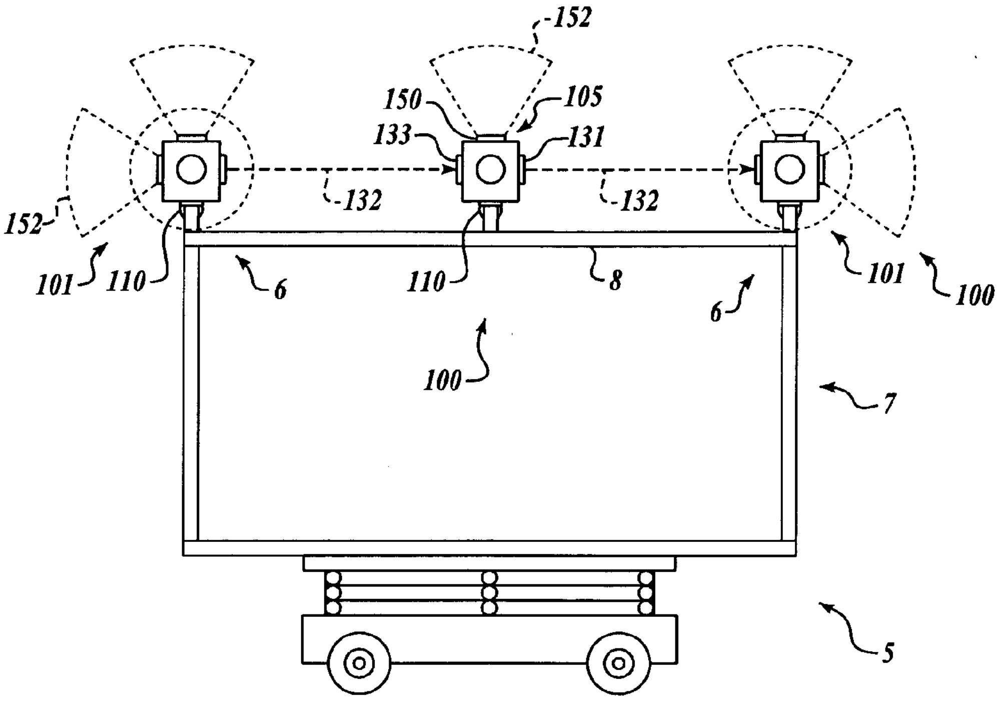
FIG. 3A is a side-view of exemplary sensor modules installed on a scissor lift in accordance with an alternate embodiment of the present invention.
Figure 3B:
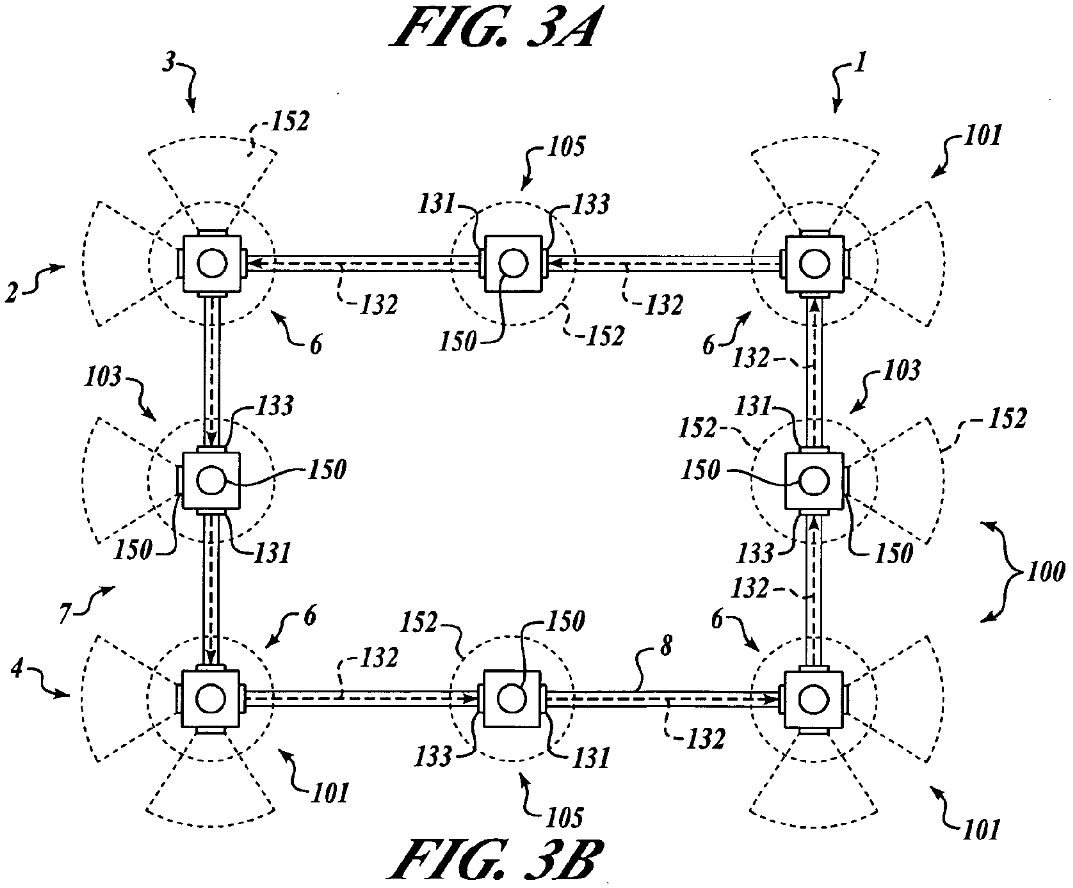
FIG. 3B is a top-view of the embodiment of the sensor modules installed on a scissor lift of FIG. 3A.

It will be appreciated that a variety of embodiments of sensor modules 100 may be utilized in combination. For example, FIG. 3A is a side view, and FIG. 3B is a top view of a lift device 5 basket 7 with a variety of sensor modules. In this alternate configuration, attached to the top rail 8 of the basket 7 are eight sensor modules: four corner modules 101 positioned at the corners of the basket 7 as described with reference to FIGS. 2A and 2B above, two front/rear modules 103 located midway between the corner modules 101 along the front and rear rails, and two side modules 105 located midway between the corner modules 101 along the side rails.

Similar to the corner modules 101 described above, on the upper surface of the side module 105 is an optical proximity detector 150 with a proximity detection region 152 "looking" upward. The side modules 105 receive an infrared beam 132 from one adjoining corner module 101 and transmit an infrared beam 132 to the other adjoining corner module 101. As best shown in FIG. 3A, the side modules 105, like the corner modules 101, include a contact switch 110 linked to the logic controller (not shown) detecting contact between the side module 105 and an object in the event the optical proximity detector 150, looking upward, fails to detect an approaching object.

FIG. 3B shows the two front/rear modules 103 situated midway between corner modules 101 at the front end 1 and the rear end 3 of the top rail 8, respectively. The front/rear modules 103 incorporate two optical proximity detectors 150, one "looking" upward and one "looking" outward, or in this instance forward in the front/rear module 103 at the front end 1 and backward and upward from the front/rear module 103 at the back end 3.

Each front/rear module 103 has an optical sensing unit 150 on the top, "looking" upward and one optical proximity detector 150 on a lateral side arranged to look outward, away from the top rail 8. The front/rear module 103 also has a through-beam receptor 133 that receives an infrared beam 132 and on an opposite lateral side, a through-beam emitter 131 that emits an infrared beam 132. The front/rear modules 103 may thus be positioned in line between two corner modules 101 receiving an infrared beam 132 from one corner module 101 and emitting an infrared beam 132 to the other corner module 101. The front/rear module 103 suitably adds additional optical proximity sensors 150 between the corner modules 101 while still maintaining continuity of infrared beams 132 along the upper perimeter of the top rail 8 of the basket 7. The front/rear modules 103 like the corner modules 101 and the side modules 105, may incorporate a contact switch 110 (hidden from view in FIGS. 3A and 3B) similarly providing back-up to the optical proximity sensors 150. The contact switch 110 may be suitably activated if an object touches the front/rear module 103.

It will thus be appreciated that the eight sensor modules shown in FIGS. 3A and 3B suitably may be assembled from interchangeable components with each module including fewer or greater sensors and/or different positions of sensors, through-beam emitters 131, and through-beam receptors 133, as suitable for the application. As described further with reference to FIGS. 4 and 13, it will be appreciated that the angle between sensors may vary from 90°, and that the angle between through-beam receptors 133 and through-beam sources 131 may be other than 180° or 90°.

Figure 4:
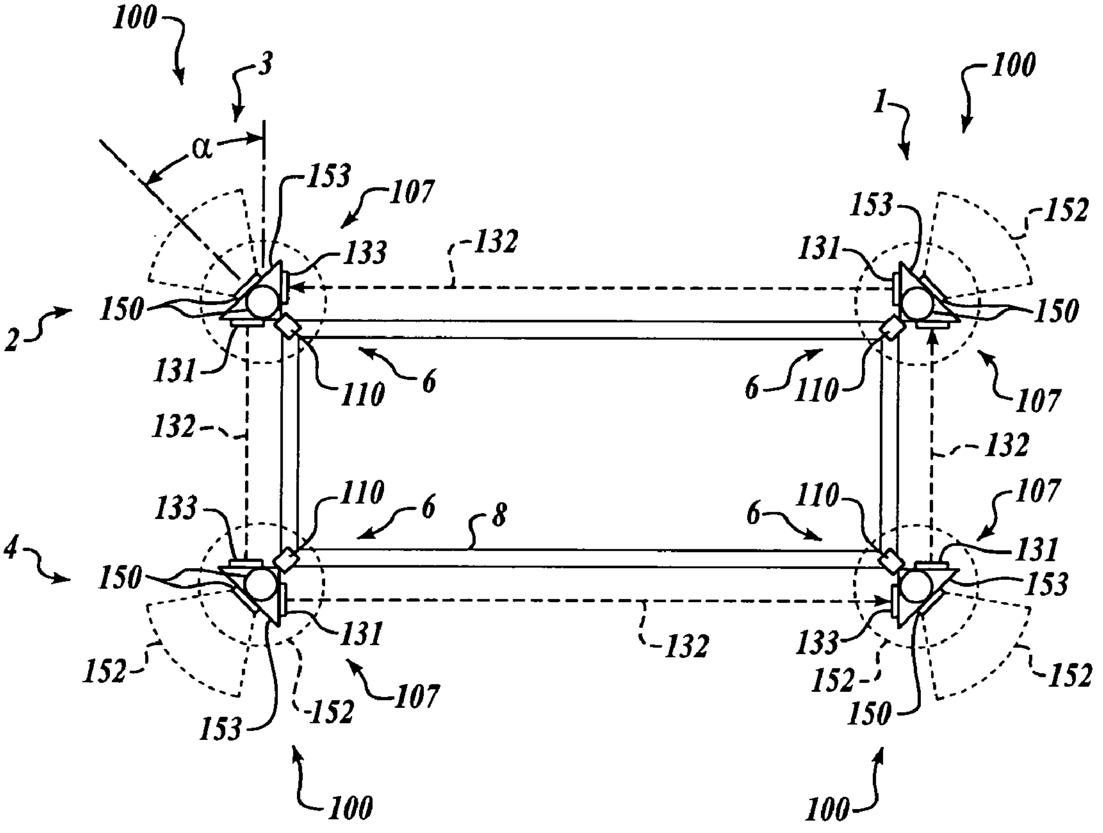
FIG. 4 is a top view of alternate sensor modules installed on a lift device in accordance with yet another embodiment of the present invention.

FIG. 4 is a top view of yet another alternate configuration of sensor modules 100 mounted to a top rail 8 of a lift device. In this embodiment, four alternate corner modules 107 are mounted to the corners 6 of the rectangular shaped top rail 8. The alternate corner modules 107 are mounted projecting diagonally outward from the corners 6. Each alternate corner unit 107 includes a contact switch 110 as described with reference to FIGS. 2A and 2B. In this embodiment, by way of example, but not limitation, the alternate corner units 107 are approximately right-angle prism shaped, triangular in top view, with a diagonal face facing outwards at the 45° angle $\alpha$ from the corners 6. Mounted to the diagonal face of the alternate corner unit 107 is an optical proximity detector 150 with its proximity detection region 52 also facing diagonally outward away from each corner 6. The four alternate corner modules 107 provide sensor detection both forward from the front end 1, backward from the rear end 3, left from the left side 2, and right from the right side 4. Each alternate corner unit 107 also includes an optical proximity detector 150 facing upward with its optical detection region 52 facing upward (toward the viewer). Thus, the four alternate corner modules 107 provide upward-looking sensing capabilities sensing objects above the top rail 8.

Each alternate corner module 107 also includes a through-beam emitter 101 and a through-beam receptor, in this embodiment orthogonal to each other. Thus, at each corner 6, the alternate corner module 107 receives an infrared beam 132 from an adjoining alternate corner unit 107 (assuming the infrared beam 132 is not interrupted by an approaching object thus resulting in detection of the object), and emits an infrared beam 132 to its other adjoining alternate corner module 107 through a through-beam emitter 131. The four alternate corner units 107 thus in series each transmit and receive four separate infrared beams 132 around the four sides of the top rail 8, providing continuous proximity detection for any object approached by the top rail 8 between the corners 6. Objects approaching the corners 6 are sensed by the optical proximity detectors 150 on the alternate corner units 107, or if not detected by the corner units, by the objects touching the alternate corner modules 107, triggering the contact switches 110.

Figure 5:
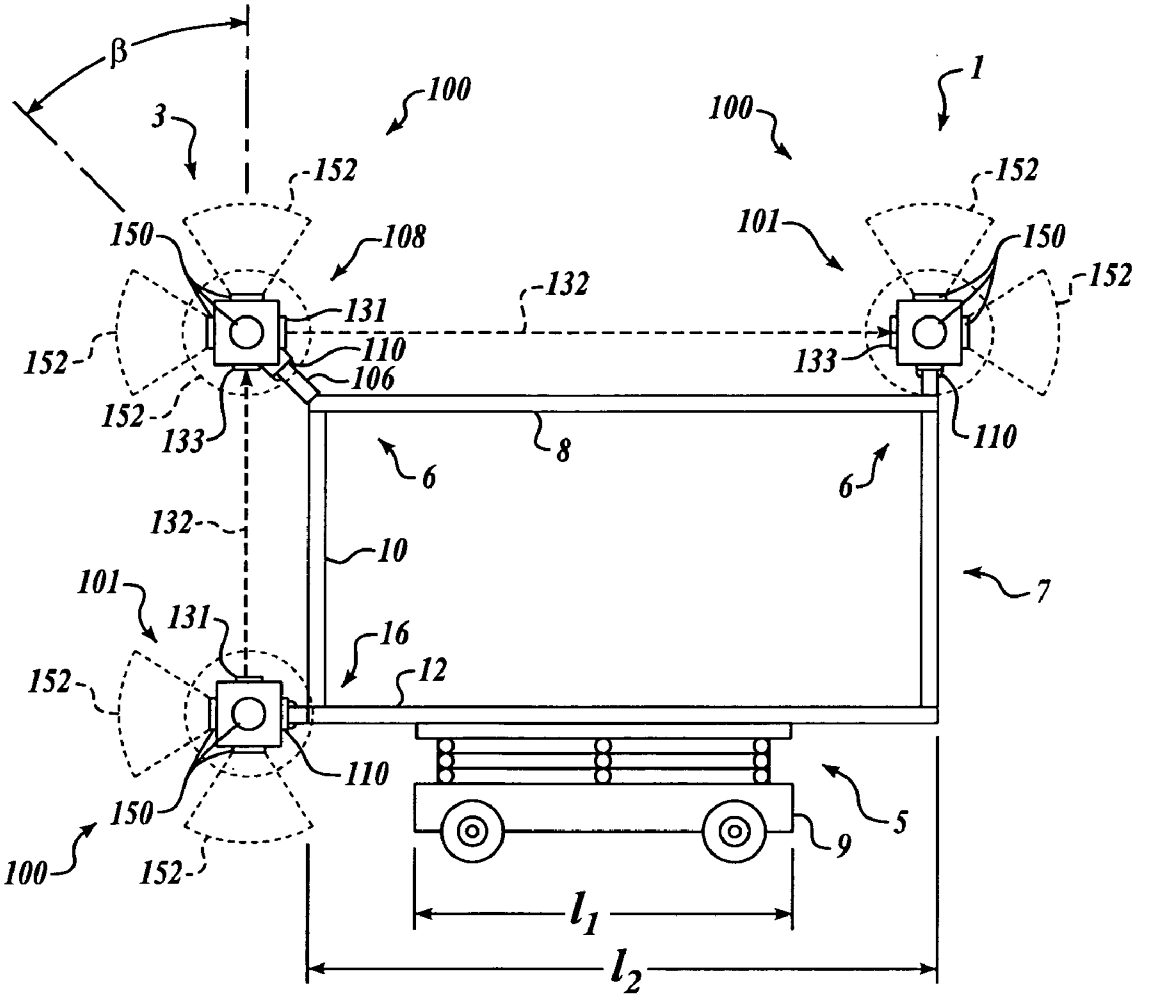
FIG. 5 is a side view of further exemplary sensor modules installed on a lift device in accordance with a further embodiment of the present invention.

FIG. 5 shows yet another configuration of sensor modules 100 around a basket 7 of a lift device 5. In accordance with this embodiment, a plurality of sensor modules 100 provide proximity detection along a top rail 8 of the lift basket 7 as well as along vertical rails 10 at the rear end 3 of the basket 7, plus “downward looking” proximity detection below lower corners 16 of the basket 7. This configuration of sensor modules 100 assists in avoiding collisions between the basket 7 and an object below the basket 7 when the basket 7 is being lowered. “Outward looking” proximity detectors near the lower corners 16 of the rear end 3 also provide greater proximity detection coverage for the back end 3 of the basket 7 when the lift device 5 is being moved in reverse.

In this alternate embodiment, corner modules 101 such as those described with reference to FIGS. 2A, 2B, 3A and 3B are attached to the front end 1 upper corners 6 and to the back end 3 lower corners 16 of the basket 7. In this side view in FIG. 5, the corner module 101 at the upper corner 6 of the front end 1 has three optical proximity detectors 150 with optical detection regions looking forward, to the side, and upward. The corner module 101 includes a contact switch 110 as described with reference to the FIGS. 2A, 2B, 3A and 3B above, detecting an object touching the corner unit 101. The corner module 101 also includes a through-beam receptor 133 and a through-beam emitter (not shown) permitting a series of infrared beams 132 to be transmitted around the perimeter of the top rail 8 permitting proximity detection of objects between the upper corners 6 in the manner described with reference to FIGS. 2A, 2B, 3A, 3B and 4 above. Similarly corner modules 101, with three optical proximity detectors 150, are mounted at the lower corners 16 on the back end 3 of the basket 7 with the optical detection regions 152 facing rear from the back end 3, downward, and laterally toward the side (toward the viewer in this view). Each corner module 101 has a through-beam emitter 131 and a through-beam receptor (not shown) permitting a series of infrared beams 132 to be projected around the perimeter (not shown) of the back end 3 of the basket 7. Again a contact switch 110 permits back-up contact sensing in the event the optical proximity detectors 150 do not detect an approaching object.

Attached to the upper corner 6 of the basket 7 at the back end 3 is a compound corner module 108. This compound corner module 108, by way of example not limitation, is mounted on the upper corner 6 on a diagonal bracket 106 projecting diagonally outward and upward from the upper corner 6 at the back end 3 of the basket 7 at an angle β of approximately 45°. This places the compound corner module 108 outside and to the rear of the rear end 3 vertical rail 10, as well as above the top rail 8. The compound corner module 108, in this exemplary embodiment, is also in the form of a cube with different sensor units on different faces. In this exemplary embodiment, the compound corner unit 108 is mounted with an optical proximity detector 150 with its proximity detection region 52 directed vertically upward. The bottom surface of the compound corner module 108 has a through-beam receptor 133 receiving an infrared beam 132 from a corner module 101 on a bottom corner 16 below the compound corner module 108. With one face of the cube of the compound corner module 108 facing upward with a proximity detector 150 one face facing downward with a through-beam sensor 133 (or alternately a through-beam source receptor 131) the remaining four faces are oriented with one surface with an optical proximity detector 150 facing rearward and one face with an optical proximity detector 150 facing to the right of the basket 7 (toward the viewer in this view). A third side of the compound corner module 108 has a through-beam emitter 131 that emits an infrared beam 132 directed at the corner module 101 positioned on the upper corner 6 at the front end 1 of the basket 7. The remaining side of the compound corner module 108 (not shown) also has a through-beam receptor receiving an infrared beam 132 (not shown in this view) from a counterpart compound corner module 108 (not shown in this view) positioned on the left side of the basket 7.

It will be appreciated that a combination of corner modules 101 and compound corner modules 108 may be utilized to provide proximity detection along any desired edge, and adjacent to any corner of the basket 7 of the lift 5. In this exemplary embodiment, the corner module 101 located at the lower corner 16 at the back end 3, by way of example, has an optical proximity detector that looks downward. This proximity detector detects objects immediately below the back end 3 of the basket 7. Warnings from this corner module thus indicate that the basket 7 should not be lowered until the lift 5 is moved so that the basket is not lowered onto equipment or fixtures, possibly causing damage. It will be appreciated that this may be useful for lifts that may extend horizontally beyond their bases. In this exemplary embodiment, the basket 7 has a length $l_2$ longer than the length $l_1$ of the base 9 of the scissor lift 5. In other embodiments, the basket 7 may have an extension actuator (not shown), or have a lift configuration like a snorkel lift, that can extend the basket 7 even further laterally beyond the base 9. As a result the scissor lift 5 can be positioned over the top of objects, making it possible through operator error to lower the basket 7 onto equipment or other objects being worked on, potentially causing damage. The optical proximity sensor 150 with its proximity detection region 152 looking downward thus in some applications suitably may be a useful addition to a collision avoidance system in accordance with the present invention.

It will be appreciated that the sensor modules 100 shown in FIG. 5, including the corner modules 101 and the compound corner modules 108, include contact switches 110 activated in the event an object touches the sensor modules 100 without, for some reason, being detected by the optical proximity detectors 150. As noted above, this helps protect the sensor modules 100 from damage, and provides a secondary detection system at the corners of the basket 7.

Figure 6:
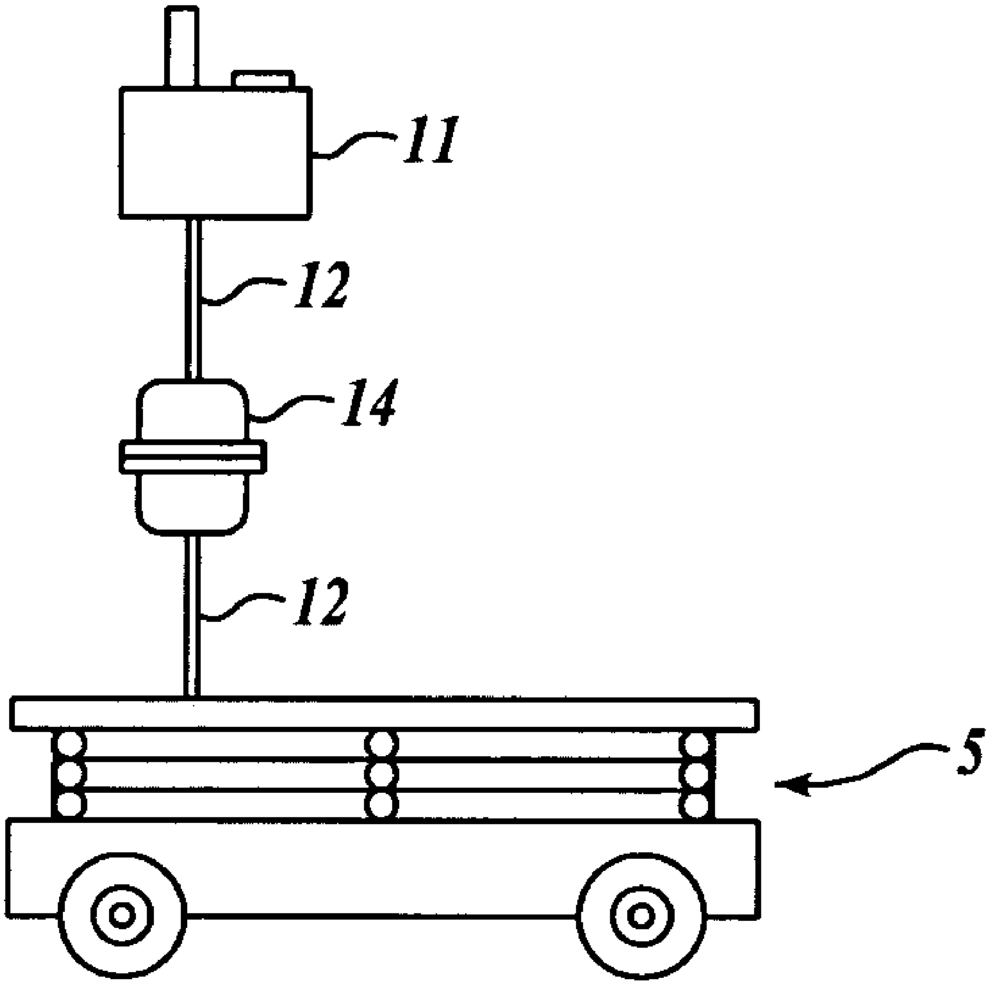
FIG. 6 (PRIOR ART)
FIG. 6 is a component diagram of an exemplary prior art manual control system for a lift device.
Figure 7:
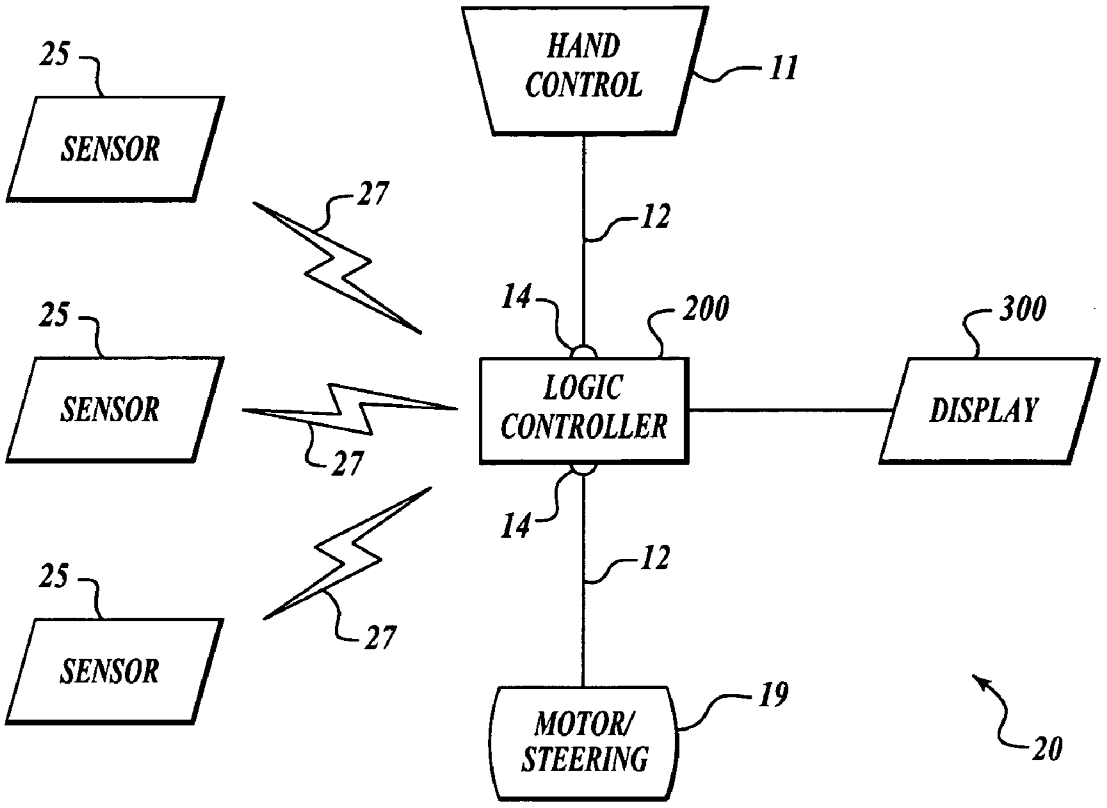
FIG. 7 is a schematic component diagram of a collision avoidance system for a lift device in accordance with an embodiment of the present invention.

As shown in FIG. 6, a prior art scissor lift 5 typically includes hand controls 11 connected through a control cable 12 and a modular connector 14 to the drive components of the scissor lift 5. FIG. 7 is a symbolic component drawing of an exemplary collision avoidance system 20 of the present invention that by way of example may be incorporated in a prior art scissor lift as described in reference to FIG. 6. The logic controller 200 of the system 20 suitably may be inserted at the modular connector 14 between the hand controls 11 and the drive components 19, such as the motor and steering drives of the scissor lift (not shown). The system 20 in accordance with an embodiment of the present invention thus may be easily coupled into a prior-art scissor lift 5, such as the device shown in FIG. 6, without modification of the scissor lift 5. In this exemplary collision avoidance system 20, the hand control 11 is connected through a control cable 12 through a modular connector 14 to the logic controller 200. In turn the logic controller 200 is connected through a modular connector 14 through a control cable 12 to the drive components 19 of the scissor lift. In this exemplary system, an indicator display 300 is wired to the logic controller displaying the status of the steering direction of the scissor lift and the sensor status, as described in more detail in connection with FIG. 11 below.

The system 20 has a plurality of sensors 25 linked or operatively connected through sensor links 27 to the logic controller. The sensors 25 sense the proximity of objects to the lift device, by way of example, but not limitation, utilizing the configurations of sensors as described with reference to FIGS. 1 through 5 above. It will be appreciated that a variety or combination of sensors may be utilized and linked to the logic controller 200. It will also be appreciated that a variety of linkages including fiber optic connections, digital wired connection, or analog wired connections may be utilized for the links 27 between the sensors 25 and the logic controller 200. A wireless link 27 may also be used between one or more sensors 25 and the logic controller. By way of example, but not limitation, a digital data bus communications link, such as a Controller Area Network or CANbus may be utilized to connect the sensors 25 to the logic controller 200, with each sensor 25 sending a digitized package of information transmitting sensing data from the sensor 25 to the controller 200 through a common bus.

Figure 8:
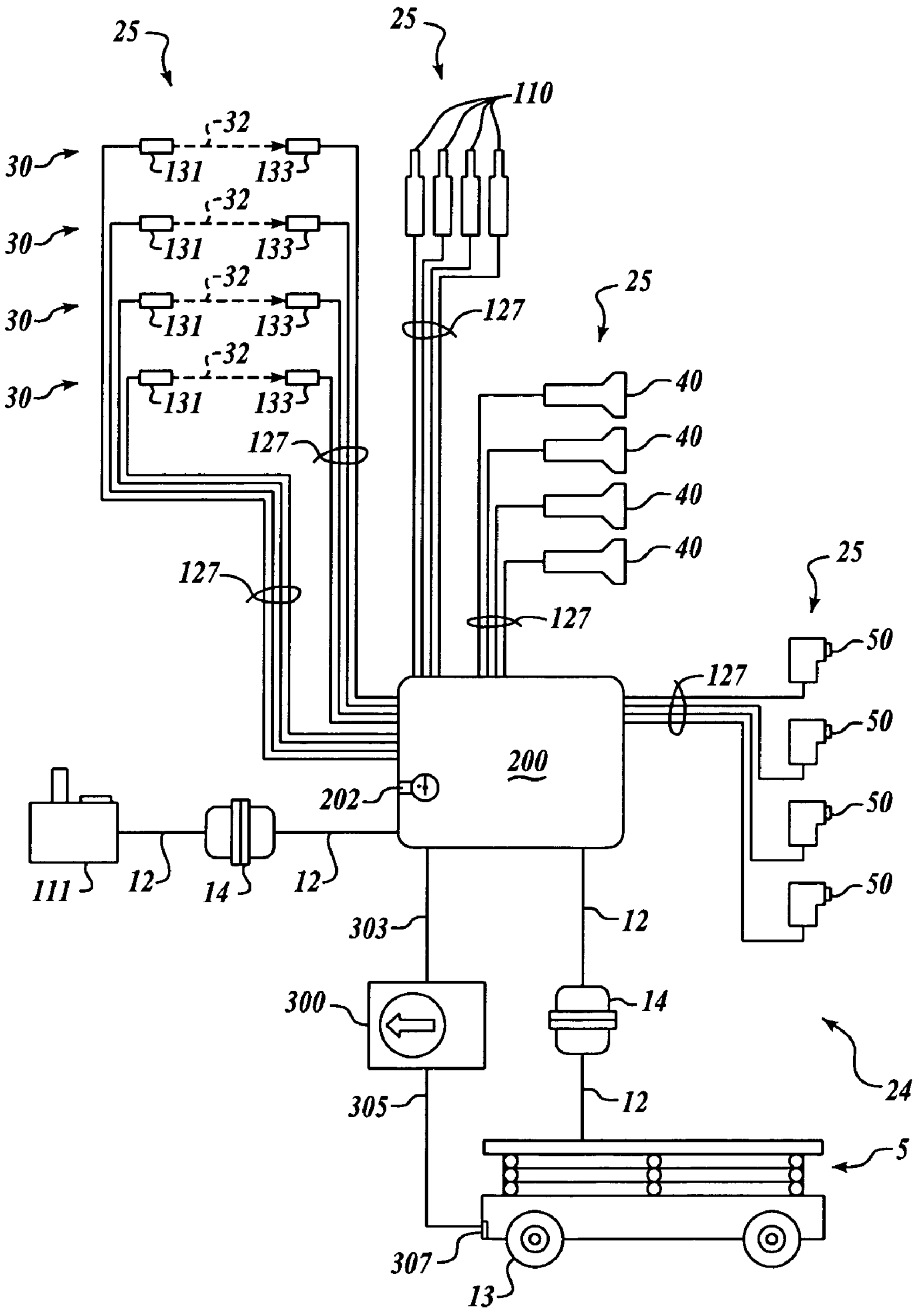
FIG. 8 is a component diagram of an exemplary collision avoidance system of an embodiment of the present invention.

FIG. 8 shows in more detail the components and wiring of an exemplary collision avoidance system 24 in accordance with an embodiment of the present invention. Hand controls 111 for a lift device 5 are linked through a control cable 12 and a modular connector to a programmable logic controller 200. The logic controller 200 is also linked through the control cable 12 and another modular connector 14 to the drive components (not shown) of the lift device 5. The logic controller 200 is advantageously configured to plug into the modular connector 14 that connects the hand controls 111 to the drive devices (not shown) of a prior art lift device 5 as described with reference to FIG. 6 above without changing the wiring of the lift device 5. In this exemplary system 24, the logic controller is linked by wired cables 127 to a plurality of sensors 25. The sensors 25 may be arranged in any suitable configuration to sense objects proximate to the lift device 5 such as the configurations described with reference to FIGS. 1, 2A, 2B, 3A, 3B, 4, and 5 above. The exemplary system 24 here includes four optical proximity sensors 50. By way of example, but not limitation, the proximity sensors suitably may include BANNER OPBT3-OASBDX optical sensors. The system 24 includes four ultrasonic proximity sensors 40. By way of example, the proximity sensors suitably may be SENIX ULTRA-30-VA ultrasonic sensors. The system 24 includes four contact switches 110. By way of example, the contact sensors suitably may be ALLEN-BRADLEY 802R-WS 1CA limit switches. The contact sensors 110 by may be used for sensing objects contacting essential sensor modules such as the sensor modules 100 described with reference to FIGS. 2A, 2B, 4 and 5 above.

The system 24 includes four through-beam sensors 30 that transmit infrared beams 32 from through-beam emitters 131 to through-beam receptors 133. By way of example, the through-beam emitters and receivers suitably may be AUTOMATION DIRECT SSE-0P-4A through-beam emitters and SSR-OP-4A through-beam receivers. It will be appreciated that the through-beam sensors may utilize a mirror or reflector and thus the emitter and receiver may be in the same unit, with a mirror positioned at some distance away. Such an emitter-receiver suitably may be AUTOMATION DIRECT SSP-OP-4A polarized photoreflective sensors.

The through-beam sensors 30, the contact sensors 110, the ultrasonic proximity detectors 40, and the optical proximity detectors 50 are all linked to the logic controller 200. The logic controller 200 is programmed to operate a process discussed in more detail with reference to FIG. 10 below. In brief, the logic controller 200 suitably interrupts motion of the lift device 5 when the sensors 25 detect objects in proximity to the lift device, while still allowing the operator to move the hand controls 111 to move the lift device away from the approaching object.

The logic controller 200 includes a bypass switch 202 permitting the operator to bypass the collision avoidance system 24 if desired.

The exemplary system 24 also includes an indicator display 300 that displays sensor status and the direction in which the lift device 5 wheels 13 are steered, plus the direction the lift device will move if its wheel drive motors are activated, as described in more detail with reference to FIG. 11 below. The display 300 is linked to the logic controller 200 through a display cable 303. The display indicator also includes a connection 305 to a potentiometer 307 linked to the steering mechanism (not shown) of the lift device 5. The potentiometer 307 suitably senses the steering direction of the wheels 13. By way of example and not limitation, the steering indicator on the display 300 includes a FUTABA S3003 servo for moving the direction indicator, and a SPECTROL MODEL 157 POTENTIOMETER for the steering sensor 307.

This exemplary system 24 is configured by way of example, and not limitation, to operate on a SKYJACK MODEL 2 SCISSORLIFT. In one embodiment, the logic controller 200 suitably includes the following AUTOMATION DIRECT components: a DIRECT LOGIC 205 6-slot base, a DL240 CPU module, an F2-08TRS relay output module, a D2-16ND3-2 DC input module, a D2-16TD1-2 DC output module, an F2-08AD-2 8-channel analog voltage input module, an F2-02DA-2 2 channel analog voltage output module. The logic controller 200 is suitably mounted in a PELICAN plastic case for mounting on the lift device 5.

Figure 9:
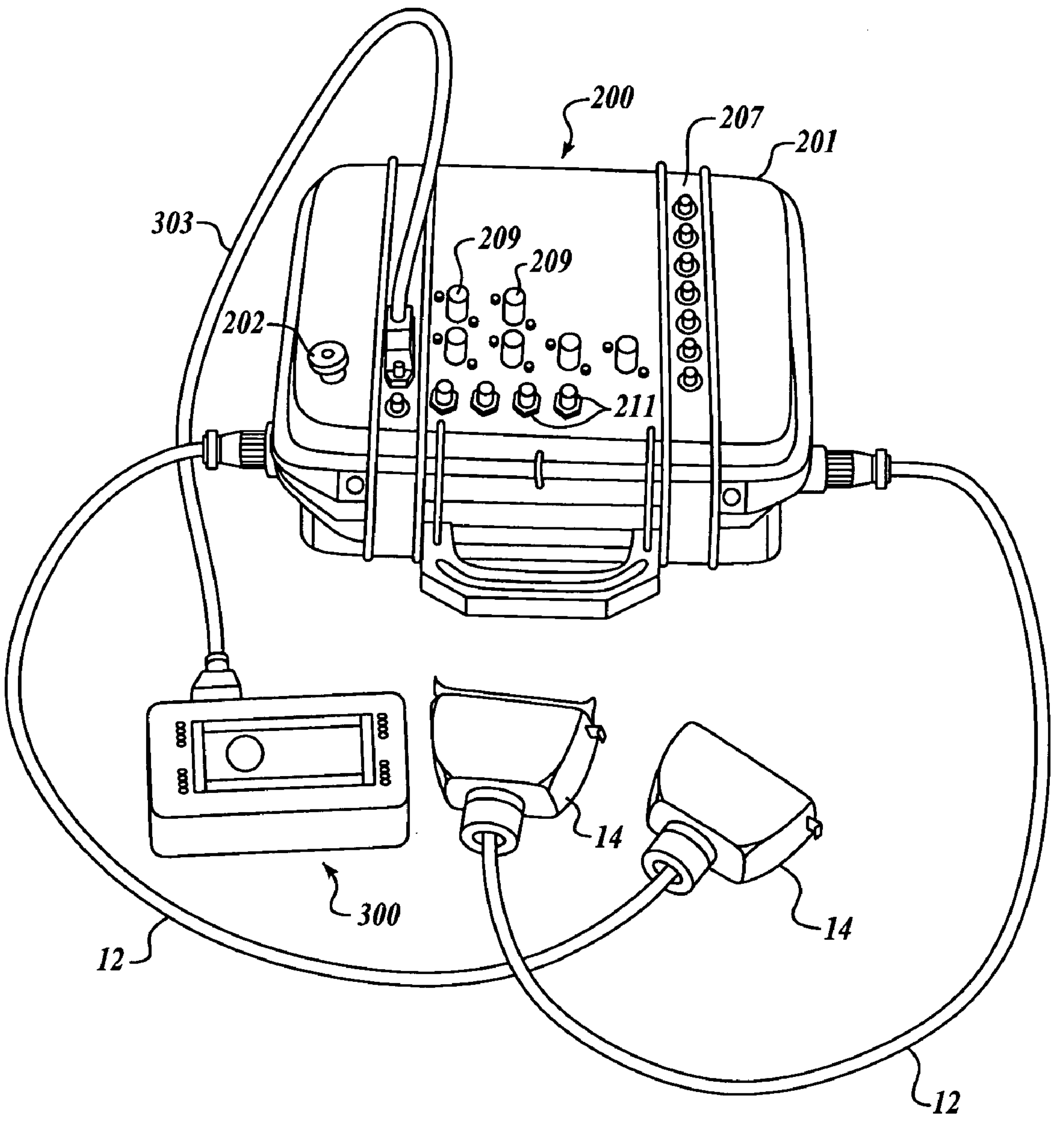
FIG. 9 is a perspective drawing of an exemplary controller and display unit in accordance with an embodiment of the present invention.

FIG. 9 is a perspective view of the system 24 of FIG. 8 showing the logic controller 200 and display device 300 with connecting cables in accordance with an embodiment of the invention. The logic controller 200 is enclosed in a plastic case 201. The case has a display connector cable 303 linking it to the logic controller 200. The logic controller 200 has two controller cables 12 with modular connectors 14 arranged to connect between the hand controls (not shown) and the drive components (not shown) of the lift device (not shown). The case 201 suitably has a plurality of connector sockets 209, 211 and 207 for the various sensors to be attached to the logic controller 200. The logic controller has a key switch 202 permitting the collision avoidance system to be bypassed by an operator.

Figure 10:
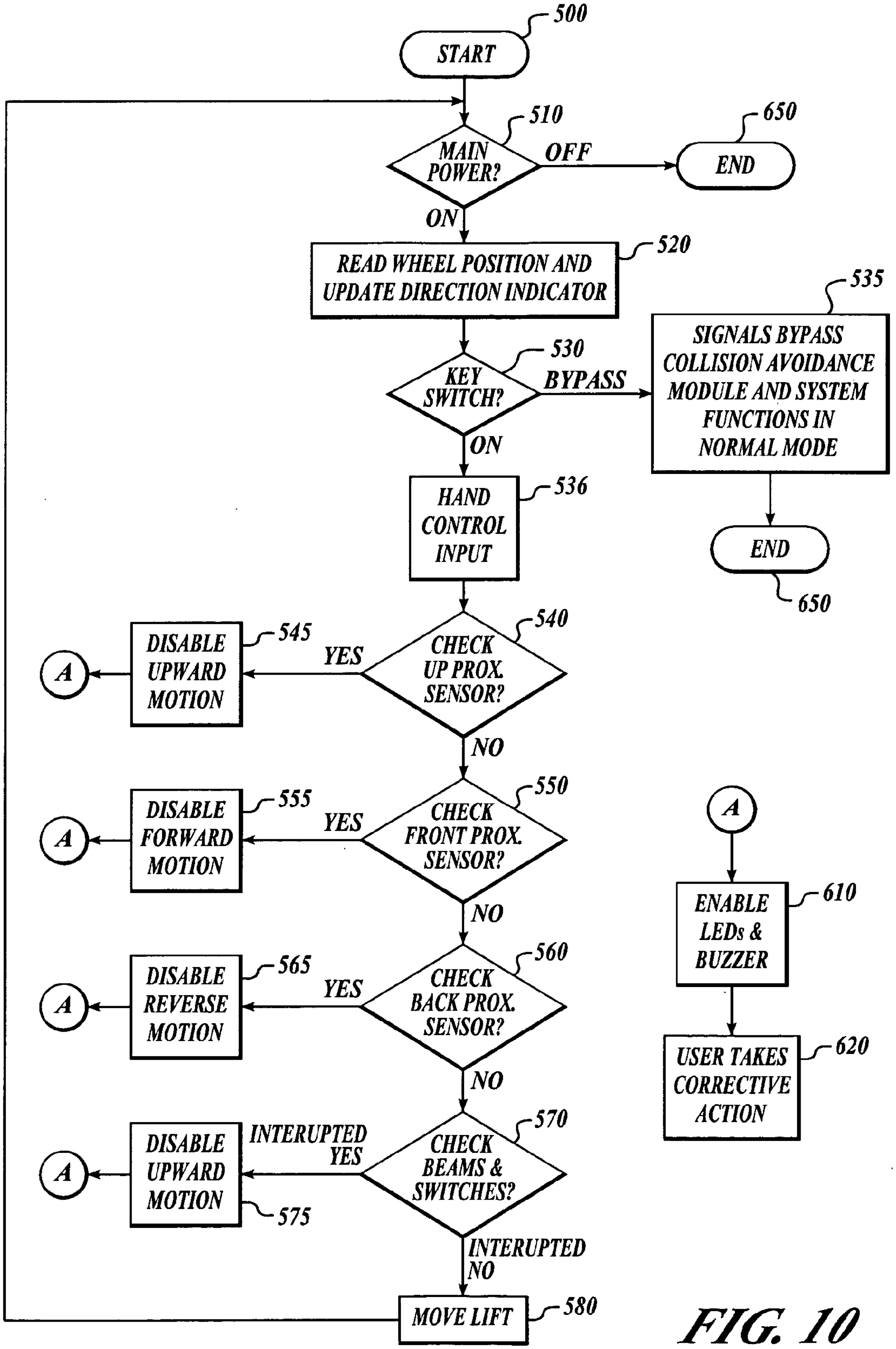
FIG. 10 is a flow chart of an exemplary method of collision avoidance in accordance with an embodiment of the present invention.

FIG. 10 shows an exemplary method of operation for a collision avoidance system in accordance with an embodiment of the present invention. At a block 500, the process starts. At a decision block 510, if the main power is off, the process ends at a block 650. If the main power is on, the system reads the wheel position and updates the direction indicator at a block 520. At a decision block 530, it is determined whether the key switch is in a bypass or an on position. If the key switch is in a bypass position, at a block 535 the signals from the collision avoidance sensors do not interrupt operation of the lift device, the lift device operates normally, and the process ends at a block 650.

If the collision avoidance key switch is "on", the system receives a hand move command at a block 536. At a decision block 540, the "up" sensors above the lift are checked. If the sensors sense a proximate object, upward motion of the lift is disabled at a block 545 and the system jumps to a block 610 where flashing LED's and a buzzer indicate a proximate object. At a block 620, the user may then take corrective action by moving in a direction other than an upward direction.

If the "up" proximity sensors do not reveal a proximate object (block 540), then the forward proximity sensors are checked at a decision block 550. If those sensors are activated, forward motion is disabled at a block 555, and again LED's and buzzers are activated at block 610 and the user is able to take corrective action at block 620. If the forward proximity sensors are not activated by a proximate object at the block 550, the "back" proximity sensors are checked at a decision block 560. If an object is sensed behind the lift, reverse motion is disabled at a block 565 and indicator LED's and a buzzer are activated at a block 610. The user may take corrective action in a block 620 (other than moving in reverse). If the "rear" proximity sensors are not activated at the block 560, the through-beams and contact switches are checked at a decision block 570. If they are interrupted, upward motion is disabled at a block 575, the LED sensors are lit and the buzzer sounds at a block 610 and the user may take corrective action at block 620. In an alternate embodiment, the determination at block 575 (or any other sensor determination block) may also include a check of any existing "downward" looking sensors.

If all of the proximity sensors show no interruption by a proximate object, the lift may be moved at a block 580 and the process returns to a block 520 for recycling through to read wheel direction and update the direction indicator and to check the sensors again.

It will be appreciated that the exemplary process of FIG. 10 is suitably adapted to an exemplary sensor system such as that shown in FIG. 2A where the through-beams and contact switches are on the top side of the lift device. Thus, if checking the beams and switches at a block 570 returns an indication that those are interrupted, upward motion is disabled. It will be appreciated that in different configurations, such as with contact switches and through-beam sensors on the sides of a lift device, that lateral motion would be disabled, and correspondingly for other sensor configurations, including downward looking sensors.

Figure 11:
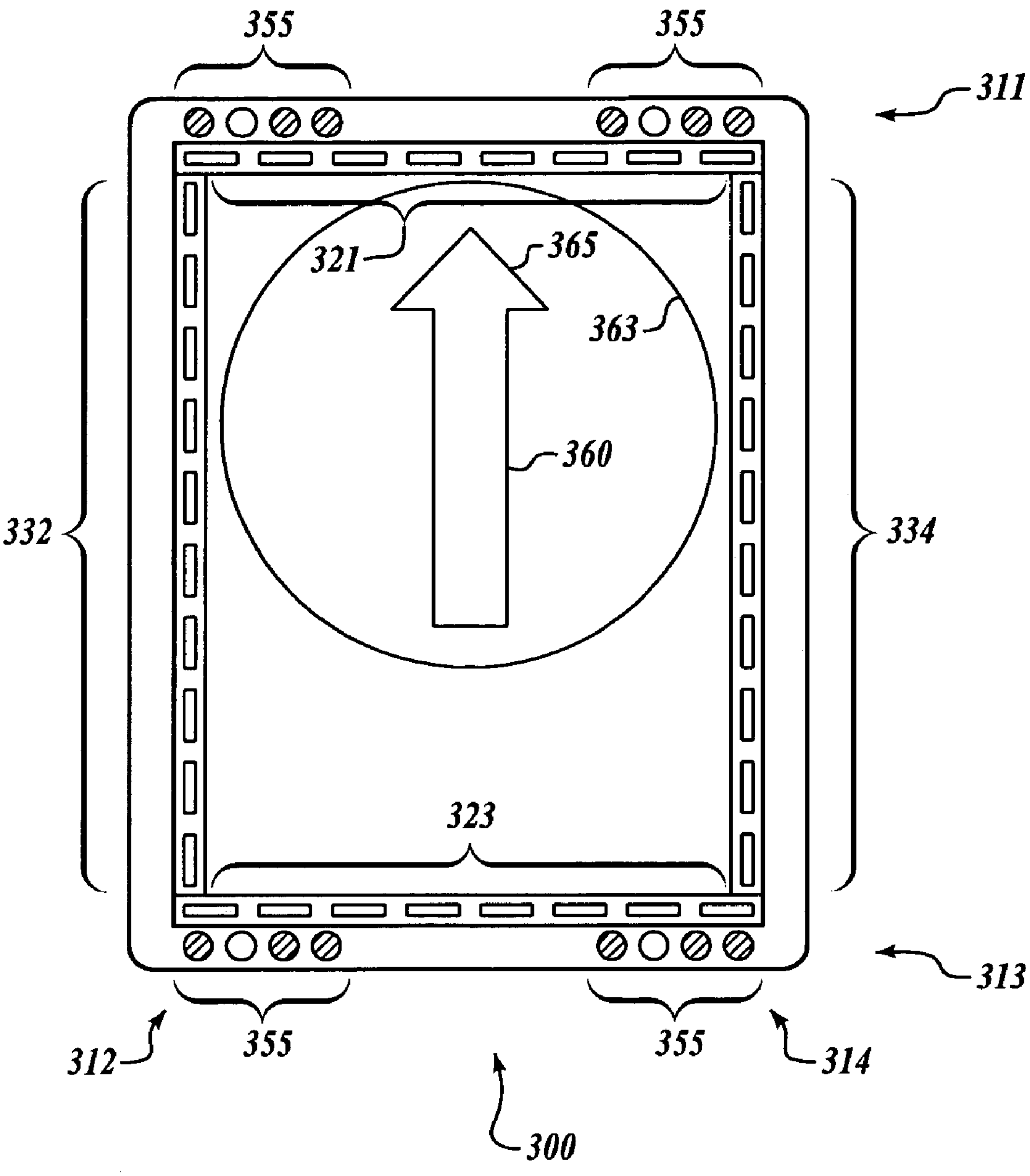
FIG. 11 is a top view of an exemplary display unit in accordance with an embodiment of the present invention.

FIG. 11 shows an exemplary status indicator display 300 for an exemplary collision avoidance system according to an embodiment of the present invention. The indicator display 300 includes a direction indicator 360 showing the angle of the steering wheels of the lift device (e.g. as shown in FIG. 8). The steering indicator 360 includes an arrowhead 365 that points in the direction that the lift device would move if the forward motion hand control of the lift device is activated. The steering angle indicator 360 is positioned within a circular display 363 that permits the indicator 360 to rotate and show all possible turn angles of the lift device.

In an exemplary embodiment, the steering angle indicator 360 is mechanically driven by a servo as described above, but it will be appreciated that any other combination of indicators such as an array of LED's or an LCD display, suitably may indicate the steering direction of the lift device. Surrounding the circular display 363 is a rectangular display of four LED light bars 321, 323, 332, and 334 that light when through-beam sensors along the front end, back end, left side and right side, respectively of the collision avoidance system sense objects breaking the through-beam sensors indicating an object at that respective side. It will be appreciated that a line of icons (display elements), such as that shown by an LCD display, suitably may be substituted for the light bars 321, 323, 332, and 334, in an alternate embodiment of the present invention. At the four corners of the rectangular light bar display are sets of four indicator lights 255 indicating the status of proximity detectors positioned at the four upper corners of a lift device equipped with an exemplary collision avoidance device in accordance with an embodiment of the present invention. In the forward 311 right 314 corner of the display 300 is a block of four lights 355 progressively indicating objects approaching that corner of the lift device. Similar blocks of lights 355 at the front 311 left 312, rear 313 left 312, and rear 313 right 314 corners of the display 300 indicate objects in proximity to the corresponding corners of the lift device. In this exemplary embodiment, the indicator lights 355 suitably include lights ranging from green to yellow to red indicating an approaching object, and then an object reaching the point at which the interrupt circuitry of the programmable logic controller of the collision avoidance system is activated. The display 300 may suitably be mounted in any position on the lift device easily viewable to an operator. The display suitably may also include an audible warning (not shown) such as a buzzer that sounds indicating an approaching object or contact.

Figure 12A:
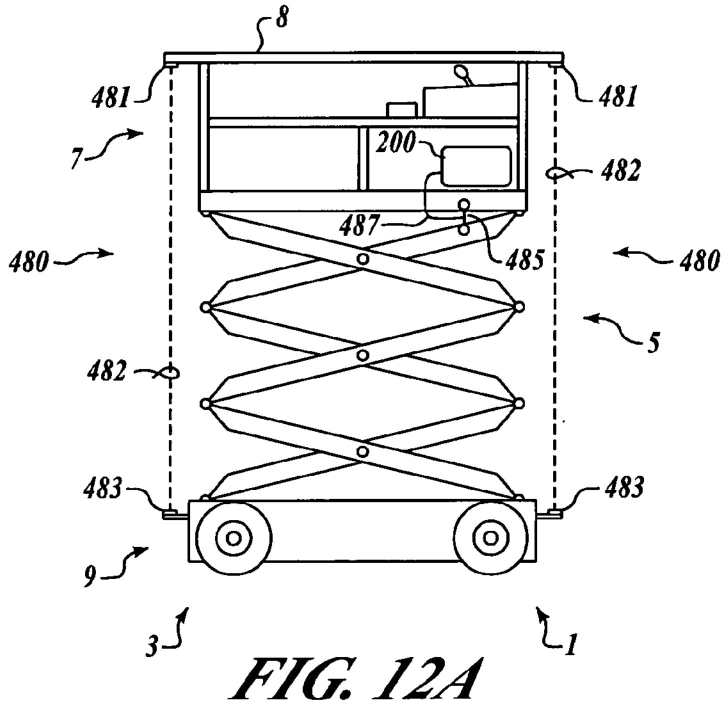
FIG. 12A is a side view of a scissor lift in an elevated configuration incorporating a light curtain sensor system in accordance with an alternate embodiment of the present invention.
Figure 12B:
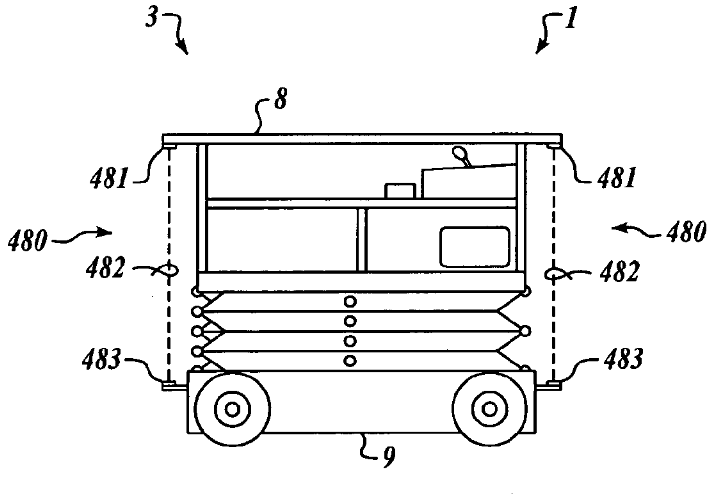
FIG. 12B is a side view of the scissor lift of FIG. 12A in a lowered configuration.
Figure 12C:
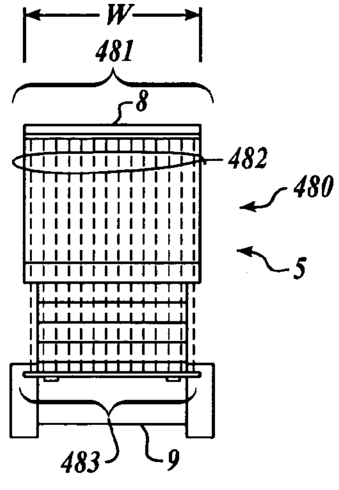
FIG. 12C is an end view of the scissor lift of FIG. 12B.

It will be appreciated that a wide variety of sensors may be utilized with a collision avoidance system in accordance with an embodiment of the present invention. FIGS. 12A, 12B, 12C show an extended side view, a retracted side view, and a retracted end view of a scissor lift 5 incorporating light curtain sensors 480 along the front end 1 and the rear end 3 of the scissor lift 5. In this exemplary embodiment, a light curtain emitter 481 is mounted to the front end 1 of the top rail 8 and the rear end 3 of the top rail 8. Two light curtain sensors 483 are mounted on the front end 1 of the base 9 and the rear end 3 of the base 9 to receive either a curtain of light 482 being transmitted by the light curtain emitters 481. Changes in the light received by the light curtain receivers 483 indicate the presence of an object penetrating either the front or rear light curtains 480 indicating the proximity of an object, thus permitting the collision avoidance to interrupt operation of the lift 5.

The light curtain sensors 480 may be any suitable type of sensor, and may, for example, include emitters and receivers that permit objects penetrating a plane to be sensed. By way of example, but not limitation, suitable light curtains in this exemplary embodiment may include Allen-Bradley GUARDMASTER light curtains.

In the embodiment shown in FIG. 12, the light curtain emitter 481 and the light curtain receiver 483 may suitably extend entirely across the width w of the lift device 5. It will be appreciated that, in this exemplary embodiment, with the light curtain emitter 481 mounted on the top rail 8 and the light curtain receiver 483 on the base 9, the distance between the light curtain emitter 481 and the light curtain receiver 483 and/or alignment may vary as the lift 5 is raised and lowered. Thus, suitable compensating circuitry may be built into the logic controller 200 to compensate for varying intensities of light input or alignment into the light curtain receiver 483, as the lift device 5 is elevated or lowered. This suitably may be accomplished with a sensor 485 that determines the degree of extension of the scissor stack 15 of the lift device 5, with that sensor 485 linked through a connection 487 to the logic controller 200. It will be appreciated that with light curtains 480 mounted along an entire side or end of the lift device 5 that the collision avoidance system in accordance with an embodiment of the present invention suitably may sense and avoid objects approached by the lift device 5 even when those objects are at varying levels with respect to the basket 7 of the lift device 5.

Figure 13:
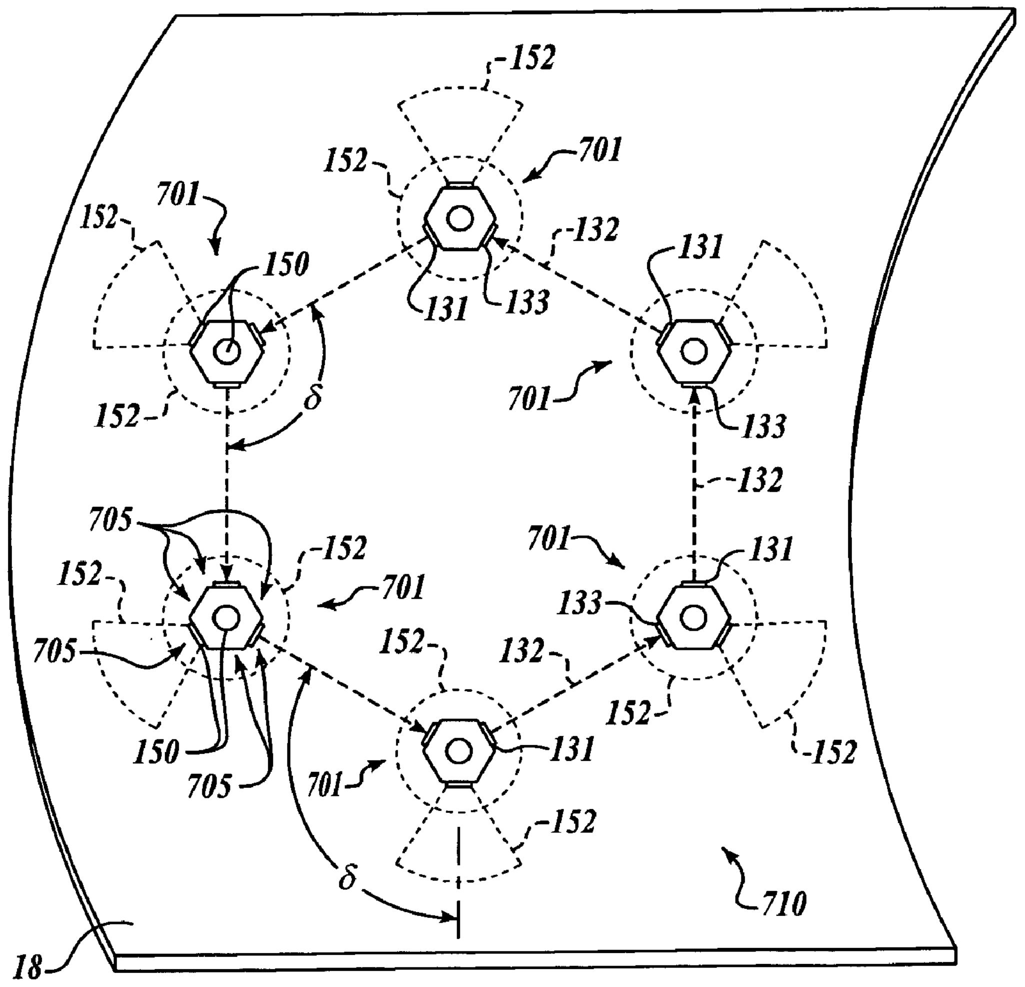
FIG. 13 is a top view of an exemplary network of sensor modules installed on a curved surface in accordance with yet another embodiment of the present invention.

Turning to FIG. 13, it will be appreciated that network sensor modules 701 incorporating a mixture of sensors in modular units in accordance with an embodiment of the present invention suitably may be utilized for proximity sensing and collision avoidance for objects and equipment with complex shapes, such as a curved surface 18. Network modules 701 in accordance with the present invention suitably may include proximity detectors, such as optical proximity detectors 150, through-beam transmitters 131 and through-beam receivers 133, positioned on faces 705 of the network module 701. These faces may be not orthogonal to each other, and may have any suitable pitch angle. The exemplary network modules 701 in this embodiment have optical proximity detectors and/or through-beam emitters 131 and through-beam receivers 133, at an angle between them δ of approximately 120° for sensors broadcasting an infrared beam 132 or having a proximity detection region 152 roughly parallel to the plane of the surface 18 being protected. In other words, in top view, the network modules 701 are roughly hexagonal, with 6 faces 705, and with a sensor on one or more faces. These exemplary network modules 701 also have an optical proximity detector 150 facing directly away from the surface 18 being protected and thus can sense an object either approaching the surface 18 and/or the surface 18 approaching an object. In this example, six network modules 701 spaced at a distance from each other form a rough hexagon draped across the curved surface 18. Infrared beams 132 link the sensor modules in a roughly hexagonal perimeter with vertices at the network modules 701. At each network module 701, an optical proximity detector 150 is positioned with its proximity detection region 152 "looking" outward laterally from the hexagon of modules 701, parallel to the surface 18, and a second optical proximity detector 150 is positioned looking "upward" perpendicular from the surface 18.

It will be appreciated that a wide variety of angles and module configurations suitably may form a network 710 of network modules 701 providing proximity sensing and/or collision avoidance for a complex surface 18. It will also be appreciated that network modules 701 suitably may incorporate contact switches (not shown) positioned to sense any contact of an object with the network modules 701. A network 710 of network modules 701 suitably may include a ring of network modules 701 such as that shown in FIG. 13, or may be a web, or chain or mixture of shapes forming a sensor network 710 for proximity sensing and collision avoidance.

While preferred and alternate embodiments of the invention have been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A system, comprising:

a lift device including a drive assembly;

at least one first sensor attached to the lift device adapted to sense an object above the lift device, wherein the at least one first sensor includes at least one optical proximity detector, at least one through-beam emitter, and at least one through-beam receiver detector; and a controller operatively coupled to the at least one first sensor and operatively coupled to the drive assembly of the lift device and adapted to interrupt operation of the drive assembly when the lift device at least one of approaches and or touches the object.

2. The system of claim 1, wherein the at least one first sensor includes a through-beam emitter and a through-beam receiver.

3. The system of claim 1, wherein the at least one first sensor includes an optical proximity detector.

4. The system of claim 1, wherein the at least one first sensor includes an ultrasonic proximity detector.

5. The system of claim 1, wherein the at least one first sensor includes a contact switch.

6. The system of claim 1, further comprising:

at least one second sensor operatively coupled to the controller, the at least one second sensor adapted to sense the object to at least one of a side and an end of the lift device.

7. The system of claim 6, wherein the at least one second sensor includes a through-beam emitter and a through-beam receiver.

8. The system of claim 6, wherein the at least one second sensor includes an ultrasonic proximity detector.

9. The system of claim 6, wherein the at least one second sensor includes a light curtain emitter and a light curtain receiver.

10. The system of claim 1, further comprising:

at least one display linked to the controller, the at least one display adapted to indicate a presence of the object proximate to the lift device.

11. A system for controlling a lift device, the system comprising:

at least one hand control adapted to control the lift device;

at least one drive adapted to move the lift device;

at least one controller operatively coupled to the at least one hand control and to the at least one drive, the controller adapted to interrupt operation of the at least one drive when the lift device at least one of approaches and touches an object;

at least one first sensor operatively coupled to the controller, the at least one first sensor adapted to sense at least one of an approach to and a contact with an object above the lift device, and to transmit a corresponding detection signal to the controller, wherein the at least one first sensor includes at least one optical proximity detector and at least one through-beam detector.

12. The system of claim 11, wherein the at least one first sensor includes a through-beam emitter and a through-beam receiver.

13. The system of claim 11, wherein the at least one first sensor includes an ultrasonic proximity detector.

14. The system of claim 11, wherein the at least one first sensor includes a contact switch.

15. The system of claim 11, further comprising:

at least one second sensor operatively coupled to the controller, the at least one second sensor adapted to sense at least one of an approach to and a contact with an object to a side and an end of the lift device, and to transmit a corresponding detection signal to the controller.

16. The system of claim 15, wherein the at least one second sensor includes a through-beam detector.

17. The system of claim 15, wherein the at least one second sensor includes an ultrasonic proximity detector.

18. The system of claim 15, wherein the at least one second sensor includes a light curtain emitter and a light curtain receiver.

19. The system of claim 11, further comprising:

at least one display linked to the controller, the at least one display adapted to indicate a presence of the object proximate to the lift device.

20. A system for controlling a lift device, the system comprising:

at least one hand control adapted to control the lift device;

at least one drive adapted to move the lift device;

at least one controller operatively coupled to the at least one hand control and to the at least one drive, the controller adapted to interrupt operation of the at least one drive when the lift device at least one of approaches and touches an object;

at least one first sensor operatively coupled to the controller, the at least one first sensor adapted to sense at least one of an approach to and a contact with an object above the lift device, and to transmit a corresponding detection signal to the controller; and at least one display linked to the controller, the at least one display adapted to indicate a presence of the object proximate to the lift device, wherein the at least one display includes a directional display adapted to display a direction the lift device will move if the at least one drive is activated.

21. A system device for sensing objects, the device comprising:

a moveable platform having a drive assembly;

a module coupled to the platform and including adapted to hold a plurality of sensors, the plurality of sensors including;

at least one first sensor configured attached to the module adapted to sense objects proximate to the system device;

at least one through-beam receiver configured attached to the module adapted to receive a light beam that may be interrupted by the proximity of objects; and at least one through-beam emitter configured attached to the module adapted to emit a light beam that may be interrupted by objects proximate to the module;

a controller operatively coupled to the module and to the drive assembly, the controller configured to interrupt operation of the drive assembly in response to a detection signal from the module; and a display coupled to the drive assembly and configured to indicate a presence of the object proximate to the lift device, and further configured to indicate a direction drive assembly will move the platform if activated.

22. The system of claim 21, wherein the at least one first sensor includes an ultrasonic proximity detector.

23. The system of claim 21, wherein the at least one first sensor includes an optical proximity detector.

24. The system of claim 21, wherein the at least one first sensor includes a contact switch.

25. The system of claim 21, further comprising:

a contact switch linked to the module, the contact switch arranged to detect an object touching the module.

26. A system for sensing objects proximate to a surface, the system comprising:

a plurality of modules attached to a surface, each module adapted to hold a plurality of sensors, each module including at least one first sensor attached to the module adapted to detect objects proximate to the module and to transmit a corresponding first detection signal, at least one through-beam receiver attached to the module adapted to detect a light beam that may be interrupted by the proximity of objects and to transmit a corresponding second detection signal, and at least one through-beam emitter attached to the module adapted to emit a light beam that may be interrupted by the proximity of objects, the plurality of modules positioned with respect to the surface with the at least one through-beam emitter of a module being in optical communication with the at least one through-beam receiver of an adjoining module, and to transmit a corresponding third detection signal;

a processor operatively coupled to the at least one first sensor and the at least one through-beam receiver attached to each of the plurality of modules, the processor adapted receive the first, second, and third detection signals, and output an indication of the proximity of an object to the surface.

27. The system of claim 26, wherein the at least one first sensor includes an ultrasonic proximity detector.

28. The system of claim 26, wherein the at least one first sensor includes an optical proximity detector.

29. The system of claim 26, wherein the at least one first sensor includes a contact switch.

30. The system of claim 26, further comprising:

a plurality of contact switches, each contact switch linked to one of the plurality of modules, each contact switch arranged to detect an object touching one of the plurality of modules.

31. A display system, comprising:

a lift device including a steering mechanism, a direction indicator operatively connected to the steering mechanism, the direction indicator adapted to indicate an angle the steering mechanism is oriented;

at least one sensor device adapted to detect a presence of an object proximate to the lift device; and at least one proximity display operatively connected to the at least one sensor device, the at least one proximity display adapted to indicate the presence of an object proximate to the lift device detected by the at least one sensor device.

32. The system of claim 31, wherein the at least one sensor device includes a through-beam sensor device, and the at least one proximity display includes at least one line of lights indicating the presence of an object proximate to the lift device detected by the through-beam sensor device.

33. The system of claim 31, wherein the at least one sensor device includes a through-beam sensor device and wherein the at least one proximity display includes at least one line of icons indicating the presence of an object proximate to the lift device detected by a through-beam sensor device linked to the proximity display.

34. The system of claim 31, wherein the at least one sensor device includes a proximity sensor and wherein the at least one proximity display includes at least one icon indicating the presence of an object proximate to the lift device sensed by the proximity sensor linked to the proximity display.

35. The system of claim 31, wherein the direction indicator further indicates a lateral direction the lift device will move if a propulsion device driving the lift across the a supporting surface is engaged.

36. A method for controlling a lift device, comprising:

providing a sensor module adapted to monitor a plurality of scanning regions proximate the lift device for the presence of an approaching object and to detect the approaching object prior to physical contact with the approaching object, wherein at least two of the scanning regions are approximately orthogonally disposed relative to each other;

providing a sensor module includes providing a sensor module having at least one through-beam detector, and wherein detecting an approaching object includes detecting an approaching object using the through-beam detector;

monitoring the plurality of scanning regions for an approaching object;

moving at least a portion of the lift device using a drive assembly;

detecting an approaching object within at least one of the scanning regions proximate to the lift device; and interrupting the operation of the drive assembly in response to the detection of the approaching object.

37. The method of claim 36, wherein providing a sensor module includes providing a sensor module having a first proximity sensor adapted to monitor a first scanning region approximately along a first scanning axis, and a second through-beam sensor adapted to monitor a second scanning region approximately along a second scanning axis, wherein the first and second scanning axes are approximately orthogonal.

38. A method for assembling aircraft, comprising:

approaching an aircraft component with a lift device;

indicating a direction a steering device of the lift device is turned;

detecting the aircraft component proximate to a portion of the lift device;

interrupting a motion command from being communicated to a drive component driving a motion of the lift device towards the aircraft component; and stopping the lift device.

39. The method of claim 38, further comprising displaying a warning to the worker of the aircraft component being proximate to a surface of the lift device.

40. An apparatus, comprising:

a lift device including a drive assembly;

at least one sensor module operatively coupled to the lift device, the sensor module being adapted to monitor a plurality of scanning regions proximate the lift device for the presence of an approaching object and to detect the approaching object prior to physical contact with the approaching object, wherein at least two of the scanning regions are approximately orthogonally disposed relative to each other;

wherein the sensor module includes a first proximity sensor adapted to monitor a first scanning region approximately along a first scanning axis, and a second through-beam sensor adapted to monitor a second scanning region approximately along a second scanning axis, wherein the first and second scanning axes are approximately orthogonal; and a controller operatively coupled to the sensor module and operatively coupled to the drive assembly, the controller being adapted to interrupt operation of the drive assembly in response to a detection signal from the sensor module.

41. The apparatus of claim 40, wherein at least two of the scanning regions are approximately disposed about a scanning axis, and wherein the scanning axes of the at least two scanning regions are approximately orthogonal.

42. The apparatus of claim 40, wherein the sensor module includes a third through-beam sensor adapted to monitor a third scanning region approximately along a third scanning axis, wherein the first, second, and third scanning axes are approximately orthogonal.

* * * * *